(12) United States Patent
Yoneda et al.

(10) Patent No.: US 7,442,749 B2
(45) Date of Patent: Oct. 28, 2008

(54) SULFUR-CONTAINING POLY (UNSATURATED CARBOXYLIC ACID) AND ITS USES AND PRODUCTION PROCESS

(75) Inventors: Atsuro Yoneda, Toyonaka (JP); Takahiro Tsumori, Suita (JP); Koji Fukuhara, Osaka (JP); Shigeru Yamaguchi, Yao (JP)

(73) Assignee: Nippon Shokubai Co., Ltd., Osaka (JP)

( * ) Notice: Subject to any disclaimer, the term of this patent is extended or adjusted under 35 U.S.C. 154(b) by 251 days.

(21) Appl. No.: 10/641,939

(22) Filed: Aug. 15, 2003

(65) Prior Publication Data

US 2004/0044151 A1 Mar. 4, 2004

(30) Foreign Application Priority Data

Aug. 29, 2002 (JP) .............................. 2002-251218

(51) Int. Cl.
  *C08F 4/06* (2006.01)
(52) U.S. Cl. .................... 526/90; 526/317.1; 526/324; 526/286
(58) Field of Classification Search ............... 526/317, 526/324, 286, 317.1, 90
 See application file for complete search history.

(56) References Cited

U.S. PATENT DOCUMENTS

| | | | | | |
|---|---|---|---|---|---|
| 3,651,015 | A | * | 3/1972 | Ishida et al. | 528/223 |
| 4,272,422 | A | * | 6/1981 | Tanaka | 524/566 |
| 4,503,172 | A | | 3/1985 | Farrar et al. | |
| 4,743,664 | A | * | 5/1988 | Matui et al. | 526/64 |
| 4,792,343 | A | | 12/1988 | Hawe et al. | |
| 5,384,379 | A | * | 1/1995 | Bader et al. | 526/286 |
| 5,874,511 | A | * | 2/1999 | Rizzardo et al. | 526/286 |
| 6,197,847 | B1 | * | 3/2001 | Kato et al. | 523/160 |
| 6,207,780 | B1 | * | 3/2001 | Stockhausen et al. | 526/287 |
| 6,310,156 | B1 | * | 10/2001 | Maeda et al. | 526/234 |
| 6,329,480 | B1 | * | 12/2001 | Uchiumi et al. | 526/173 |
| 6,395,813 | B1 | | 5/2002 | Duccini et al. | |
| 6,458,908 | B1 | * | 10/2002 | Imai et al. | 526/259 |
| 6,489,372 | B1 | * | 12/2002 | He et al. | 521/40 |
| 6,742,456 | B1 | * | 6/2004 | Kasperchik et al. | 101/483 |
| 2002/0049147 | A1 | * | 4/2002 | Saeki et al. | 510/337 |
| 2004/0039080 | A1 | * | 2/2004 | Honda et al. | 523/120 |

FOREIGN PATENT DOCUMENTS

| | | |
|---|---|---|
| EP | 0 182 600 A2 | 5/1986 |
| JP | 59-223702 A | 12/1984 |
| JP | 5-86125 A | 4/1993 |
| JP | 05086125 A * | 4/1993 |
| JP | 06239942 A * | 8/1994 |
| JP | 11-315115 A | 11/1999 |
| JP | 11315115 A * | 11/1999 |
| JP | 2000-53729 A | 2/2000 |
| JP | 2000-355615 A | 12/2000 |
| JP | 2001-70778 A | 3/2001 |
| JP | 2001107094 A * | 4/2001 |

* cited by examiner

*Primary Examiner*—Randy Gulakowski
*Assistant Examiner*—Michael M Bernshteyn

(57) ABSTRACT

There are disclosed a novel sulfur-containing poly(unsaturated carboxylic acid) and its uses and production process. A sulfur-containing poly(unsaturated carboxylic acid) having a weight-average molecular weight (Mw) of 500 to 4,500 and a molecular weight distribution (Mw/Mn) of not more than 2.5 is obtained by a production process comprising the step of polymerizing an unsaturated carboxylic acid in the presence of a polymerization initiator to thereby obtain the poly(unsaturated carboxylic acid), wherein: a combination of a persulfate and a bisulfite is used as the polymerization initiator, wherein the polymerization initiator is adjusted in such a manner that: the total amount of the polymerization initiator as used is not smaller than 10 g equivalents per 1 mol of the unsaturated carboxylic acid as used, and the amount of the bisulfite accounts for not smaller than 8 g equivalents of the total amount of the polymerization initiator as used; and the polymerization temperature is controlled so as to be in the range of 25 to 99° C. This polymer is used as an essential component of a detergent builder and a kaolin dispersant.

8 Claims, No Drawings

SULFUR-CONTAINING POLY (UNSATURATED CARBOXYLIC ACID) AND ITS USES AND PRODUCTION PROCESS

BACKGROUND OF THE INVENTION

A. Technical Field

The present invention relates to a sulfur-containing poly(unsaturated carboxylic acid) and its uses and production process, wherein the sulfur-containing poly(unsaturated carboxylic acid) is suitably used for such as detergent builders and kaolin dispersants.

B. Background Art

Kaolin is excellent in the whiteness degree, the ink receivability, and the printability, and is therefore one of inorganic pigments commendatorily used in paper manufacturing industries. As dispersants as used when a slurry is obtained by dispersing the kaolin into water, there are known polycarboxylate salts such as polyacrylate salts, polymethacrylate salts, and polymaleate salts.

These polycarboxylate salts are used also as such as detergent builders.

JP-A-223702/1984 (patent document 1) discloses that a sulfonic-acid-group-containing polyacrylic polymer is used as a pigment dispersant. The polymer as disclosed in this document is a polymer as obtained by copolymerizing a sulfonic-acid-group-containing monomer (specifically, 2-acrylamido-2-methylpropanesulfonic acid) to thereby introduce the sulfonic acid group.

It is desirable that the kaolin slurry should have a concentration as high as possible from the viewpoint of its transportation costs and productivity. However, the high-concentration slurry is so viscous as to be disadvantageous in its handling. Therefore desired are dispersants that can give a low-viscosity kaolin slurry even if this slurry has a high concentration. However, the patent document 1 does not disclose that: in the case of using this polyacrylate salt with the sulfonic acid group at its end in order to disperse the kaolin, then the rise of the viscosity is not caused, even if the kaolin concentration is made high. The dispersion stability in the passage of time is also necessary for the kaolin slurry. However, the patent document 1 does not disclose, either, that the above sulfur-containing polyacrylate salt is effective to the stability of the slurry in the passage of time.

According to the present inventors' tracing tests, when an attempt was made to disperse high-concentration kaolin by using the above sulfur-containing polyacrylic polymer as disclosed in the patent document 1, then it was difficult to inhibit the rise of the viscosity, and the dispersion stability of the resultant kaolin slurry in the passage of time was not sufficient, either.

SUMMARY OF THE INVENTION

A. Object of the Invention

Accordingly, an object of the present invention is to provide a novel sulfur-containing poly(unsaturated carboxylic acid) and its uses and production process, wherein the sulfur-containing poly(unsaturated carboxylic acid) can suitably be used for such as kaolin dispersants and detergent builders.

B. Disclosure of the Invention

The present inventors have considered that the aforementioned prior art problems as to the kaolin dispersants can be solved if the sulfur-containing poly(unsaturated carboxylic acid) is made to have such a low weight-average molecular weight as to be lower than 5,000 and further made to have a narrow molecular weight distribution. However, no prior arts can produce such a sulfur-containing poly(unsaturated carboxylic acid) having a low weight-average molecular weight and a narrow molecular weight distribution. Accordingly, the present inventors have tried to improve the production process for the sulfur-containing poly(unsaturated carboxylic acid). As a result, they have completed the present invention by finding out that the lowering of the molecular weight of the sulfur-containing poly(unsaturated carboxylic acid) and the narrowing of the molecular weight distribution of it can be actualized if the unsaturated carboxylic acid is polymerized in the presence of a polymerization initiator, wherein the polymerization initiator is used not in one kind alone but in combination of at least two kinds, and wherein the mutual ratio between the polymerization initiators as used in combination above and the total amount of them are properly adjusted, and wherein the polymerization temperature is also properly adjusted.

Accordingly, a sulfur-containing poly(unsaturated carboxylic acid), according to the present invention, has a weight-average molecular weight (Mw) of 500 to 4,500 and a molecular weight distribution (Mw/Mn) of not more than 2.5.

In the above present invention sulfur-containing poly(unsaturated carboxylic acid), it is favorable that the unsaturated carboxylic acid is acrylic acid and/or methacrylic acid.

A detergent builder, according to the present invention, comprises the above present invention sulfur-containing poly(unsaturated carboxylic acid) as an essential component.

A kaolin dispersant, according to the present invention, comprises the above present invention sulfur-containing poly(unsaturated carboxylic acid) as an essential component, wherein the sulfur-containing poly(unsaturated carboxylic acid) has a weight-average molecular weight (Mw) of 500 to 3,000.

In addition, a production process for a sulfur-containing poly(unsaturated carboxylic acid), according to the present invention, is characterized by comprising the step of polymerizing an unsaturated carboxylic acid in the presence of a polymerization initiator to thereby obtain the poly(unsaturated carboxylic acid), wherein: a combination of at least one persulfate and at least one bisulfite is used as the polymerization initiator, wherein the polymerization initiator is adjusted in such a manner that: the total amount of the polymerization initiator as used is not smaller than 10 g equivalents per 1 mol of the unsaturated carboxylic acid as used, and the amount of the bisulfite accounts for not smaller than 8 g equivalents of the total amount of the polymerization initiator as used; and the polymerization temperature is controlled so as to be in the range of 25 to 99° C.

These and other objects and the advantages of the present invention will be more fully apparent from the following detailed disclosure.

DETAILED DESCRIPTION OF THE INVENTION

Hereinafter, detailed descriptions are given about the present invention sulfur-containing poly(unsaturated carboxylic acid) and its uses and production process. However, the scope of the present invention is not bound to these descriptions. And other than the following illustrations can also be carried out in the form of appropriate modifications of the following illustrations within the scope not departing from the spirit of the present invention.

—Sulfur-Containing Poly(Unsaturated Carboxylic Acid)—

The present invention sulfur-containing poly(unsaturated carboxylic acid) has a weight-average molecular weight (Mw) of 500 to 4,500, favorably 500 to 3,000, more favorably 500 to 2,000. The present invention sulfur-containing poly (unsaturated carboxylic acid) has a molecular weight distribution (Mw/Mn) of not more than 2.5, favorably not more than 2.0, more favorably not more than 1.8.

Although there is no limitation, yet the present invention sulfur-containing poly(unsaturated carboxylic acid) favorably has a structure such that the sulfur is bound to its molecular end in the form of a sulfonic acid group.

Incidentally, the weight-average molecular weight (Mw) and the molecular weight distribution (Mw/Mn) of the present invention sulfur-containing poly(unsaturated carboxylic acid) are measured by gel permeation chromatography (GPC) under the following conditions (Mn denotes the number-average molecular weight).

GPC column: G-3000 PWXL (produced by TOSOH Corporation).

Eluent: an aqueous solution as prepared by adding pure water to 34.5 g of disodium hydrogenphosphate dodecahydrate and 46.2 g of sodium dihydrogenphosphate dihydrate for the entirety to be 5,000 g and then filtering the resultant mixture with a membrane filter of 0.45 μm.

Detector: Model No. 481 produced by Waters Co., Ltd. (wave length of UV for detection: 214 nm).

Pump: L-7110 (produced by Hitachi Seisakusho Co., Ltd.).

Flow rate of the eluent: 0.5 mL/min.

Temperature: 35° C.

Calibration curve: drawn using poly(sodium acrylate) standard samples produced by Sowa Kagaku Co., Ltd.

—Production Process for Sulfur-containing Poly(Unsaturated Carboxylic Acid)—

The present invention production process for obtaining the above present invention sulfur-containing poly(unsaturated carboxylic acid) comprises the step of polymerizing an unsaturated carboxylic acid in the presence of a polymerization initiator to thereby obtain the poly(unsaturated carboxylic acid), wherein: a combination of at least one persulfate and at least one bisulfite is used as the polymerization initiator, wherein the polymerization initiator is adjusted in such a manner that: the total amount of the polymerization initiator as used is not smaller than 10 g equivalents per 1 mol of the unsaturated carboxylic acid as used, and the amount of the bisulfite accounts for not smaller than 8 g equivalents of the total amount of the polymerization initiator as used; and the polymerization temperature is controlled so as to be in the range of 25 to 99° C.

In the present invention production process for a sulfur-containing poly(unsaturated carboxylic acid), because, as is mentioned above, not only the persulfate but also the bisulfite is added as the polymerization initiator within the above amount range, the resultant poly(unsaturated carboxylic acid) is inhibited from having a molecular weight higher than is necessary, so that the polymer having a low molecular weight and a narrow molecular weight distribution can be efficiently produced. In addition, a ration of sulfur-containing groups (e.g. sulfonic acid group) can be introduced into the molecular end of the resultant poly(unsaturated carboxylic acid). That a ration of sulfur-containing groups (e.g. sulfonic acid group) can be introduced indicates that the persulfate and bisulfite function very favorably as the polymerization initiator. Accordingly, it is not necessary to add an excessive amount of polymerization initiator to the polymerization reaction system, and the amount of the polymerization initiator can be saved. Therefore, the increase of production costs of the polymer can be inhibited, and the production efficiency can be enhanced.

The poly(unsaturated carboxylic acid) as obtained is such that its aggregation due to salts of metals such as calcium is inhibited so as to have good gelation resistance.

Because the amount of the polymerization initiator as added to the polymerization reaction system and the polymerization temperature are controlled in their respective certain ranges, the generation of a large quantity of sulfur dioxide gas can be inhibited, and the formation of impurities can also be reduced, and still more enhancement of the performance of the poly(unsaturated carboxylic acid) as obtained can also be achieved.

Specific examples of the unsaturated carboxylic acid as used in the present invention production process include acrylic acid, methacrylic acid, maleic acid, itaconic acid, fumaric acid, crotonic acid, and citraconic acid. These may be used either alone respectively or in combinations with each other. Favorably, acrylic acid and/or methacrylic acid is used.

The present invention sulfur-containing poly(unsaturated carboxylic acid) may be neutralized with an alkaline substance, or may be a polymer as produced by polymerizing the above-mentioned unsaturated carboxylic acid after partially neutralizing it with the alkaline substance. That is to say, in the present specification, the conception of the present invention sulfur-containing poly(unsaturated carboxylic acid) includes its salts. In addition, the conception of the unsaturated carboxylic acid, as used in the present invention production process, also includes its salts. Examples of the above alkaline substance include: hydroxides and carbonates of such as sodium, potassium, and lithium; ammonia; organic amines such as trimethylamine, triethylamine, monoethanolamine, diethanolamine, triethanolamine, and pyridine; inorganic amines such as hydroxylamine; and hydroxides and carbonates of such as calcium, magnesium, aluminum, and zinc. Particularly favorable of the above is the sodium hydroxide that is inexpensive and industrially easily available.

When the polymer is obtained by the present invention production process, it is also possible to copolymerize other monomers copolymerizable with the unsaturated carboxylic acid in such a range as does not damage the effects of the present invention. Specific examples of the copolymerizable monomer component include: amidic monomers, such as (meth)acrylamide and t-butyl(meth)acrylamide; hydrophobic monomers, such as (meth)acrylate esters, styrene, 2-methylstyrene, and vinyl acetate; unsaturated sulfonic monomers, such as vinylsulfonic acid, allylsulfonic acid, methallylsulfonic acid, styrenesulfonic acid, 2-acrylamido-2-methylpropanesulfonic acid, and 3-allyloxy-2-hydroxypropanesulfonic acid, sulfoethyl (meth)acrylate, sulfopropyl (meth)acrylate, 2-hydroxysulfopropyl (meth)acrylate, and sulfoethylmaleimide, or their partially or completely neutralized products from monovalent metals, divalent metals, ammonia, and organic amines; hydroxyl-group-containing unsaturated monomers, such as 3-methyl-3-buten-1-ol (isoprenol), 3-methyl-2-buten-1-ol (prenol), 2-methyl-3-buten-2-ol (isoprene alcohol),. 2-hydroxyethyl (meth)acrylate, polyethylene glycol mono(meth)acrylate, polypropylene glycol mono(meth)acrylate, polyethylene glycol monoisoprenol ether, polypropylene glycol monoisoprenol ether, polyethylene glycol monoallyl ether, polypropylene glycol monoallyl ether, glycerol monoallyl ether, α-hydroxyacrylic acid, N-methylol(meth)acrylamide, glycerol mono (meth)acrylate, and vinyl alcohol; cationic monomers, such as dimethylaminoethyl (meth)acrylate and dimethylaminopropyl(meth)acrylamide; nitrile-group-containing monomers, such as (meth)acrylonitrile; and phosphorus-containing monomers, such as (meth)acrylamidomethanephosphonic acid, methyl ester of (meth)acrylamidomethanephosphonic acid, and 2-(meth)acrylamido-2-methylpropanephosphonic acid. However, there is no especial limitation. The ratio of the monomer being copolymerized with the unsaturated carboxylic acid is favorably in the range of 0 to 10 mol %, more favorably 0 to 5 mol %, still more favorably 0 to 3 mol %, relative to the unsaturated carboxylic acid.

A favorable form of the present invention poly(unsaturated carboxylic acid) is poly((meth)acrylic acid). Therefore, detailed descriptions are hereinafter given again about the case where the mode for carrying out the present invention production process is a production process for the poly ((meth)acrylic acid).

The monomer component that is a raw unsaturated carboxylic acid as used in the polymerization will do if only it is a monomer component from which the poly((meth)acrylic acid) can be produced by polymerization. Therefore, there is no especial limitation. That is to say, the monomer component will do if it is a monomer component including at least the (meth)acrylic acid (which may hereinafter be referred to as monomer (1)). If necessary, the monomer component may further include a water-soluble monoethylenically unsaturated monomer copolymerizable with the (meth)acrylic acid (the above water-soluble monoethylenically unsaturated monomer may hereinafter be referred to as monomer (II)) and/or a monomer other than these monomers (this other monomer may hereinafter be referred to as monomer (III)). The monomer component as hereupon referred to consists of the monomers, and does not include any of solvents, polymerization initiators, and other materials as used when the polymerization is carried out.

Specific examples of the monomer (I) include acrylic acid and methacrylic acid. Either one of them may be used, or both may jointly be used. However, the monomer (I) is favorably used in the form of the acrylic acid alone or a mixture as obtained by mixing the acrylic acid and the methacrylic acid in a predetermined ratio.

The mixing ratio of the monomer (I) in the monomer component is usually in the range of 50 to 100 mol %, favorably 70 to 100 mol %, more favorably 90 to 100 mol %, relative to the entire monomer component. In the case where the mixing ratio of the monomer (I) is less than 50 mol %, it is difficult to display the chelating ability and the gelation-resisting ability with a good balance.

Specific examples of the water-soluble monoethylenically unsaturated monomer (II) copolymerizable with the (meth) acrylic acid include: monoethylenically unsaturated aliphatic monocarboxylic acids, such as crotonic acid and α-hydroxyacrylic acid; salts as obtained by partially or completely neutralizing the above monoethylenically unsaturated aliphatic monocarboxylic acids with alkaline metals; salts as obtained by partially or completely neutralizing the above monoethylenically unsaturated aliphatic monocarboxylic acids with ammonia or organic amines (e.g. monoethanolamine and triethanolamine); monoethylenically unsaturated aliphatic dicarboxylic acids, such as maleic acid, fumaric acid, and itaconic acid; salts as obtained by partially or completely neutralizing the above monoethylenically unsaturated aliphatic dicarboxylic acids with alkaline metals; salts as obtained by partially or completely neutralizing the above monoethylenically unsaturated aliphatic dicarboxylic acids with ammonia or organic amines (e.g. monoethanolamine and triethanolamine); sulfonic-acid-group-containing monoethylenically unsaturated monomers, such as vinylsulfonic acid, allylsulfonic acid, and 3-allyloxy-2-hydroxypropanesulfonic acid; salts as obtained by partially or completely neutralizing the above monoethylenically unsaturated monomers with alkaline metals; salts as obtained by partially or completely neutralizing the above monoethylenically unsaturated monomers with ammonia or organic amines (e.g. monoethanolamine and triethanolamine); and hydroxyl-group-containing unsaturated hydrocarbons, such as 3-methyl-2-buten-1-ol (which may be referred to simply as prenol) and 3-methyl-3-buten-1-ol (which may be referred to simply as isoprenol). However, there is no especial limitation. As to the monomer (II), one or more compounds according to the necessity can be fitly selected from among the above compounds and then used. Of the above compounds, it is more favorable to use at least one compound selected from among the unsaturated aliphatic dicarboxylic acids, the sulfonic-acid-group-containing monoethylenically unsaturated monomers, and their partially or completely neutralized salts, because these are excellent in the chelating ability, the dispersibility, and the gelation-resisting ability.

When the monomer (II) is used, its mixing ratio is usually not more than 50 mol %, favorably not more than 30 mol %, more favorably not more than 10 mol %, relative to the entire monomer component. In the case where the mixing ratio of the monomer (II) is more than 50 mol %, there is a possibility that the chelating ability may be lowered.

There should be no especial limitation on the monomer (III) other than the monomers (I) and (II). However, for example, hydrophobic monomers, such as vinyl acetate, vinylpyrrolidone, vinyl ethers, styrene, (meth)acrylate esters (e.g. methyl (meth)acrylate and ethyl (meth)acrylate), can be used. As to these monomers (III), one or more compounds according to the necessity can be fitly selected and then used. When the hydrophobic monomer is used as the monomer (III), the resultant poly((meth)acrylic acid) has excellent dispersibility but may have bad gelation resistance. Therefore, depending on the uses of the poly((meth)acrylic acid), it is necessary to restrict the mixing ratio of the monomer (III).

When the hydrophobic monomer is used as the above monomer (III), the mixing ratio of the monomer (III) is usually less than 40 mol %, favorably in the range of 0 to 20 mol %, more favorably in the range of 0 to 10 mol %, relative to the entire monomer component.

The monomers (I) to (III) may be used in the form of a solution (favorably, an aqueous solution) by being dissolved into the below-mentioned solvent (favorably, water). In the case where the monomers (I) to (III) are used in the form of their solution, their concentration is usually not less than 10 weight %, favorably in the range of 30 to 95 weight %, more favorably 50 to 90 weight %. In the case where the concentration of the monomers (I) to (III) is less than 10 weight %, there is a possibility that: the concentration of the resultant product may be so low that its transportation and custody are complicated.

In the present invention production process for a poly(unsaturated carboxylic acid), the combination of the persulfate and bisulfite is used as the initiator system favorably for the introduction of the sulfonic acid group into the end of the polymer. However, the initiator system is not especially limited to this combination. The initiator system is usable if it is a system such that: the sulfonic acid group can be introduced, and the polymer having a low molecular weight can be obtained.

Specific examples of the above persulfate include sodium persulfate, potassium persulfate, and ammonium persulfate. In addition, specific examples of the bisulfite include sodium bisulfite, potassium bisulfite, and ammonium bisulfite. Furthermore, such as a sulfite and a pyrosulfite may be used instead of the bisulfite.

As to the persulfate and bisulfite as the polymerization initiator, it is important that their amounts as used are adjusted in the following way. That is to say, first of all, it is necessary that the total amount of both as used is not smaller than 10 g equivalents, favorably not smaller than 11 g equivalents, more favorably not smaller than 12 g equivalents, per 1 mol of the unsaturated carboxylic acid that is a raw material. Although not limited, it is favorable that the upper limit of the total amount as used is adjusted to not larger than 20 g equivalents per 1 mol of the unsaturated carboxylic acid. Even though the persulfate and bisulfite are added in such a large amount, the present invention is advantageous in that: because the polymerization temperature is limited to a low temperature, the generation of sulfur dioxide gas and the formation of impurities in the production process can be reduced remarkably, and the sulfur-containing group (e.g. sulfonic acid group) can favorably be introduced into the end or side chain of the poly(unsaturated carboxylic acid) as obtained, and besides, there can be inhibited the deterioration of the performance of the poly(unsaturated carboxylic acid) as obtained and the precipitation of impurities during the retention at a low temperature. In the case where the total amount of the polymerization initiator as used is smaller than 10 g equivalents, there is a possibility that: the molecular weight of the polymer as obtained may increase, and besides, only a necessary amount of sulfur-containing group (e.g. sulfonic acid group) cannot be introduced into the end of the poly(unsaturated carboxylic acid) as obtained, and the weight-average molecular weight of the poly(unsaturated carboxylic acid) tends to be high.

Next, it is also necessary to maintain the smallest amount of the bisulfite while the above total amount as used is kept. That is to say, it is also necessary for the amount of the bisulfite to account for not smaller than 8 g equivalents of the total amount of not smaller than 10 g equivalents. In the case where the amount of the bisulfite accounting for the total amount as used is smaller than 8 g equivalents, there is a tendency such that: the effect due to the bisulfite is insufficient, so that the sulfonic acid group cannot be introduced into the end of the polymer efficiently, and the weight-average molecular weight (Mw) of the poly(unsaturated carboxylic acid) is also high.

The persulfate and bisulfite may be added in the form of a solution (favorably, an aqueous solution) by being dissolved into the below-mentioned solvent (favorably, water). In this case, the concentration of the persulfate is usually in the range of 1 to 35 weight %, favorably 5 to 35 weight %, more favorably 10 to 30 weight %. The concentration of the bisulfite is usually in the range of 10 to 40 weight %, favorably 20 to 40 weight %, more favorably 30 to 40 weight %. In the case where these concentrations are less than the lower limits, there is a possibility that: the concentration of the resultant product may be so low that its transportation and custody are complicated. In the case where these concentrations are more than the upper limits, there is a possibility that the polymerization initiator may precipitate.

The present invention does not exclude such a mode for carrying out the present invention as further uses other polymerization initiators (including chain transfer agents) besides the above combination of the persulfate and bisulfite. If necessary, such other polymerization initiators may fitly be used in such a range as does not have a bad influence on the effects of the present invention. Examples of the above other initiators (including chain transfer agents) include: azo compounds, such as 2,2'-azobis(2-amidinopropane) dihydrochloride, 4,4'-azobis-4-cyanovaleric acid, 2,2'-azobisisobutyronitrile, and 2,2'-azobis(4-methoxy-2,4-dimethylvaleronitrile); organic peroxides, such as benzoyl peroxide, lauroyl peroxide, peracetic acid, di-t-butyl peroxide, and cumene hydroperoxide; and hydrogen peroxide. These other polymerization initiators can also be used in the form of a solution (favorably, an aqueous solution).

In the present invention, it is also possible that an appropriate amount of additive other than the polymerization initiator is added to the polymerization reaction system in such a range as does not damage the effects of the present invention. As such an additive, there can be used such as heavy-metal-concentration-adjusting agents, organic peroxides, $H_2O_2$, and metal salts.

As a favorable mode for carrying out the present invention, there is a mode of carrying out the polymerization of the unsaturated carboxylic acid in the presence of a heavy metal ion, because, if the heavy metal ion is allowed to exist in the polymerization reaction system, then the amount of the persulfate and bisulfite as mixed can be saved. Hereupon, the heavy metal refers to a metal having a specific gravity of not less than 4 $g/cm^3$. Specific examples of the heavy metal include iron, cobalt, manganese, chromium, molybdenum, tungsten, copper, silver, gold, lead, platinum, iridium, osmium, palladium, rhodium, and ruthenium. At least two heavy metals may be used. The polymerization reaction system contains these ions, favorably an iron ion. There is no especial limitation on the ionic valence of the heavy metal ion. For example, in the case where the iron is used as the heavy metal, the iron ion as dissolved during the polymerization reaction may be $Fe^{2+}$, $Fe^{3+}$, or a combination of them.

Although not especially limited, the heavy metal ion content is favorably in the range of 0.1 to 10 ppm relative to the total weight of the polymerization reaction liquid when the polymerization reaction has been completed. When the polymerization reaction has been completed refers to when the polymerization reaction has substantially been completed in the polymerization reaction liquid to thereby obtain the desirable polymer. For example, in the case where the polymer as obtained by carrying out the polymerization in the polymerization reaction liquid is neutralized with an alkaline component, the heavy metal ion content is calculated on the basis of the total weight of the neutralized polymerization reaction liquid. In the case where at least two heavy metal ions are contained, they will do if the total amount of the heavy metal ions is in the above range.

In the case where the heavy metal ion content is less than 0.1 ppm, there is a possibility that the effects due to the heavy metal ion may not be displayed sufficiently. On the other hand, in the case where the heavy metal ion content is more than 10 ppm, there is a possibility that the color tone of the polymer may be deteriorated. In addition, in the case where the heavy metal ion content is much, there is a possibility that: stains may increase in the use as a detergent builder, and scale may increase in the use as a scale inhibitor.

It is also possible that the heavy metal ion is allowed to exist in the polymerization system by directly adding a heavy metal compound to the polymerization system, or by adding, to the polymerization system, a solution in which the heavy metal compound is dissolved. The heavy metal compound as used then is determined according to the heavy metal ion which is desired to be contained in the polymerization reaction liquid. In the case where water is used as a solvent, water-soluble heavy metal salts are favorable. Examples of the water-soluble heavy metal salts include Mohr's salt (Fe $(NH_4)_2(SO_4)_2 \cdot 6H_2O$), ferrous sulfate heptahydrate, ferrous chloride, ferric chloride, and manganese chloride.

It is previously mentioned that it is also possible that an appropriate amount of additive other than the polymerization initiator is added to the polymerization reaction system. The heavy-metal-concentration-adjusting agent that is previously cited as an example of such additives is the heavy metal compound as referred to above. There should be no especial limitation on this heavy-metal-concentration-adjusting agent, but compounds or simple substances of multivalent metals can be utilized. Specific examples thereof include: water-soluble multivalent metal salts, such as vanadium oxytrichloride, vanadium trichloride, vanadyl oxalate, vanadyl sulfate, vanadic anhydride, ammonium metavanadate, ammonium hypovanadous sulfate [$(NH_4)_2 SO_4 \cdot VSO_4 \cdot 6H_2O$], ammonium vanadous sulfate [$(NH_4)V(SO_4)_2 \cdot 12H_2O$], copper (II) acetate, copper (II), copper (II) bromide, copper (II) acetylacetonate, ammonium cupric chloride, ammonium copper chloride, copper carbonate, copper (II) chloride, copper (II) citrate, copper (II) formate, copper (II) hydroxide, copper nitrate, copper naphthenate, copper (II) oleate, copper maleate, copper phosphate, copper (II) sulfate, cuprous chloride, copper (I) cyanate, copper iodide, copper (I) oxide, copper thiocyanate, iron acetylacetonate, ammonium iron citrate, ammonium ferric oxalate, ammonium ferrous sulfate, ammonium ferric sulfate, iron citrate, iron fumarate, iron maleate, ferrous lactate, ferric nitrate, iron pentacarbonyl, ferric phosphate, and ferric pyrophosphate; multivalent metal oxides, such as vanadium pentaoxide, copper (II) oxide, ferrous oxide, and ferric oxide; multivalent metal sulfides, such as iron (III) sulfide, iron (II) sulfide, and copper sulfide; and copper powder, and iron powder.

In the case where the sodium persulfate is used as the persulfate as the polymerization initiator, sodium sulfate is formed as an impurity. The present inventors have found out that the amount of the persulfate and bisulfite as used can be saved by making the polymerization reaction liquid contain the heavy metal ion. Although its mechanism is not clear, yet the efficiency of the persulfate and bisulfite as being the initiator can be enhanced by making the polymerization reaction liquid contain the heavy metal ion. Therefore, even a small amount of persulfate and/or bisulfite enables the progress of the reaction to the same extent as conventional. If the amount of the persulfate and bisulfite used as the initiator is saved, the amount of impurities being formed also decreases. Furthermore, because the amount of the heavy metal ion as added for obtaining the effects of the present invention is a trace, almost no impurities as derived from the heavy metal ion are formed.

It is desirable to carry out the polymerization of the unsaturated carboxylic acid in a solvent. In this case, as the solvent, aqueous solvents (e.g. water, alcohols, glycols, glycerin, and polyethylene glycols) are favorable, and the water is particularly favorable. These may be used either alone respectively or in combinations with each other. In addition, for the purpose of enhancing the solubility of the unsaturated carboxylic acid into the solvent, organic solvents may fitly be added thereto in such a range as does not have a bad influence on the polymerization of the unsaturated carboxylic acid. As the organic solvents as used for such a purpose, there can be used at least one organic solvent as fitly selected from among: lower alcohols, such as methanol and ethanol; amides such as dimethylformamide; and ethers, such as diethyl ether, dioxane, and tetrahydrofuran.

The amount of the above solvent as used is usually in the range of 40 to 200 weight %, favorably 45 to 180 weight %, more favorably 50 to 150 weight %, relative to the entire unsaturated carboxylic acid. In the case where the amount of the above solvent as used is smaller than 40 weight %, the molecular weight of the resultant poly(unsaturated carboxylic acid) is high. On the other hand, in the case where the amount of the above solvent as used is larger than 200 weight %, the concentration of the produced poly(unsaturated carboxylic acid) is so low that it is necessary to remove the solvent when the occasion demands. Incidentally, the majority or entirety of the above solvent may be charged into a reaction vessel at the initial stage of the polymerization. However, as to a portion of the solvent, it may properly be added alone into the reaction system during the polymerization, or may properly be added into the reaction system during the polymerization together with the monomer component, the initiator component, and another additive in such a form that these components have beforehand been dissolved into the solvent.

The dropwise addition time of the bisulfite or its solution among the components as dropwise added to the reaction system during the polymerization is desirably completed earlier than the completion of the dropwise addition of the unsaturated carboxylic acid or its solution by 1 to 30 minutes, favorably 1 to 20 minutes, more favorably 1 to 15 minutes. Thereby, the amount of the bisulfite after the end of the polymerization can be reduced, so that the generation of sulfur dioxide gas and the formation of impurities due to the above bisulfite can be inhibited effectively. Therefore, the impurities, as formed due to dissolution of the gas-phase sulfur dioxide gas into a liquid phase after the end of the polymerization, can remarkably be reduced. The reason for this is because: it is desirable that the polymerization initiator including the bisulfite as an essential component should be consumed and should not remain at the end of the polymerization; and, in the case where the bisulfite remains after the end of the polymerization, the impurities form to lead to bringing about such as the deterioration of the performance of the resultant polymer composition and the precipitation of the impurities during the retention at a low temperature.

Also as to the, dropwise addition time of the persulfate or its solution, the amount of residual monomer can be reduced by delaying the completion time of the dropwise addition by the same time as of the bisulfite.

In the present invention production process, the polymerization temperature is usually in the range of 25 to 99° C., favorably 50 to 95° C., more favorably 70 to 90° C. In the case where the polymerization temperature is lower than 25° C., the productivity is lowered because of the rise of the molecular weight, the increase of the impurities, and besides, the excessive prolongation of the polymerization time. On the other hand, in the case where the polymerization temperature is higher than 99° C., the sulfur dioxide gas is generated in a large quantity due to decomposition of the bisulfite that is a polymerization initiator, and this gas dissolves into the liquid phase after the polymerization to form the impurities or is discharged outside the system during the polymerization to fail to obtain sufficient effects rewarding the addition. Incidentally, the polymerization temperature hereupon refers to the temperature of the reaction solution in the reaction system.

Incidentally, it is not necessary to keep the polymerization temperature constant during the polymerization. For example, the polymerization may be carried out in such a manner that: the polymerization is initiated at room temperature (25° C.), and then the temperature is raised in an appropriate temperature-raising time (or at an appropriate temperature-raising rate) until the temperature reaches a predetermined temperature, and thereafter this predetermined temperature is maintained, or in such a manner that: the temperature is varied (raised or lowered) with the passage of time within the above temperature range in the course of the polymerization, depending on the method of the dropwise addition (e.g. making the dropwise addition time different according to the components being dropwise added such as the unsaturated carboxylic acid and the polymerization initiator). That is to say, if, even though the polymerization temperature temporarily deviates from the above polymerization temperature range, the polymerization temperature is in such a range as does not damage the functions and effects of the present invention, then the polymerization temperature should not be especially limited.

When the above polymerization of the unsaturated carboxylic acid is carried out, there is no especial limitation on the pressure in the reaction system. The polymerization may be carried out under any pressure selected from among ordinary (atmospheric) pressure, reduced pressure, and applied pressure. Favorably for preventing the release of the sulfur dioxide gas during the polymerization and enabling the lowering of the molecular weight, the polymerization is carried out under ordinary pressure or under applied pressure by airtightening the reaction system. In addition, from the viewpoint of production costs such as no necessity to additionally set a pressure-applying apparatus or a pressure-reducing apparatus and further no necessity to use a pressure-resistant reaction vessel or piping, it is favorable to carry out the polymerization under ordinary (atmospheric) pressure. In addition, as to the atmosphere in the reaction system, the polymerization may be carried out as it is under an air atmosphere, but the polymerization is favorably carried out under an inert gas atmosphere. For example, it is desirable to displace air in the system with an inert gas such as nitrogen before the beginning of the polymerization.

In the present invention production process, it is desirable to carry out the polymerization reaction of the above unsaturated carboxylic acid under acidic conditions. If the polymerization reaction is carried out under the acidic conditions, then the rise of viscosity of the aqueous solution of the polymerization reaction system can be inhibited, and the low-molecular polymer can favorably be produced. In addition, there are extreme advantages in that the production efficiency can greatly be raised because the polymerization can be allowed to progress under high-concentration conditions. Particularly, it is desirable that the neutralization degree during the polymerization should be lowered to 1 to 25 mol %, in that: the effects by saving the amount of the above polymerization initiator can be raised synergistically, and the effect of reducing the amount of impurities can be enhanced remarkably. It is desirable that the pH during the polymerization should be adjusted to 1 to 6, more favorably 1 to 5, still more favorably 1 to 4. In the case where the above pH is less than 1, there is a possibility that: the sulfur dioxide gas may be generated, and the corrosion of the apparatus may be caused. On the other hand, in the case where the pH is more than 6, the efficiency of the bisulfite falls, so that the molecular weight increases. The polymerization can be carried out in a high concentration and at one step by carrying out the polymerization reaction under such acidic conditions. Therefore, there can be omitted a concentration step which is occasionally necessary in conventional production processes. Accordingly, the productivity of the poly(unsaturated carboxylic acid) can greatly be enhanced, and the rise of production costs can also be suppressed.

Examples of a pH-adjusting agent for adjusting the pH of the reaction solution during the above polymerization include: alkaline metal hydroxides, such as sodium hydroxide and potassium hydroxide; alkaline earth metal hydroxides, such as calcium hydroxide and magnesium hydroxide; ammonia; and organic amines, such as monoethanolamine and triethanolamine. These may be used either alone respectively or in combinations with each other. Of these, the alkaline metal hydroxides (e.g. sodium hydroxide and potassium hydroxide) are favorable, and the sodium hydroxide is particularly favorable. In the present specification, there is a case where these are referred to simply as "pH-adjusting agents" or "neutralizing agents".

There are hereinafter once again given detailed descriptions as to the production of the poly((meth)acrylic acid) which is a favorable mode for carrying out the present invention. The neutralization degree during the polymerization is in the range of 1 to 25 mol %. However, in the case where the monomer component as used for the polymerization consists of the monomer (I), the neutralization degree is favorably in the range of 1 to 15 mol %, more favorably 2 to 10 mol %, still more favorably 3 to 10 mol %. In the case where the monomer component as used for the polymerization includes the monomer (II) in addition to the monomer (I), a portion or the entirety of the monomer (II) can be charged initially. However, in this case, the neutralization degree during the polymerization is favorably in the range of 1 to 25 mol %, more favorably 3 to 10 mol %. If the neutralization degree during the polymerization is in the above range, then the polymerization or copolymerization can be carried out most favorably both in the case of polymerizing only the monomer (I) and in the case of copolymerizing the monomer (I) and the monomer (II). In addition, the low-molecular polymer can favorably be produced without the rise of the viscosity of the aqueous solution of the polymerization reaction system. Furthermore, the polymerization can be allowed to progress under higher concentration conditions than conventional, so that the production efficiency can be raised greatly. In the case where the neutralization degree during the polymerization is less than 1 mol %, there is a case where: the amount of the sulfur dioxide gas as generated increases to raise the molecular weight. On the other hand, in the case where the neutralization degree during the polymerization is more than 25 mol %, there is a case where: the chain-transfer efficiency of the persulfate and bisulfite falls to raise the molecular weight, and besides, the viscosity of the aqueous solution of the polymerization reaction system remarkably rises with the progress of the polymerization. Therefore, the molecular weight of the polymer as obtained increases more than is necessary, so that the low-molecular polymer cannot be obtained. Furthermore, there is a case where: the above effects due to the reduction of the neutralization degree cannot be displayed sufficiently, and the amount of impurities are therefore difficult to greatly reduce.

There should be no especial limitation on the neutralization method hereupon. As the neutralizing agent, for example, the alkaline monomer (II) component (e.g. sodium (meth)acrylate) may be utilized, or the alkaline metal hydroxide (e.g. sodium hydroxide) may be used, or these may be jointly used. In addition, as to the form of the addition of the neutralizing agent during the neutralization, there may be used either its solid or a solution (favorably, an aqueous solution) including an appropriate solvent (favorably, water) and the neutralizing agent that is dissolved in the solvent. In the case where the aqueous solution is used, the concentration of this aqueous solution is usually in the range of 10 to 60 weight %, favorably 20 to 55 weight %, more favorably 30 to 50 weight %. In the case where the concentration of the above aqueous solution is less than 10 weight %, the concentration of the resultant product is so low that its transportation and custody is complicated. On the other hand, in the case where the concentration of the above aqueous solution is more than 60 weight %, there is a possibility of the precipitation, and the viscosity also rises, so that the liquid feeding is complicated.

When the polymerization is carried out, as to the monomer component, the persulfate and bisulfite as the polymerization initiator, and the other additive, it is usually favorable that: they are beforehand dissolved into an appropriate solvent (favorably, the same kind of solvent as the below-mentioned solvent to receive solutions being dropwise added) to prepare a monomer component solution, a polymerization initiator solution, and an other-additive solution; and then the polymerization is carried out while each of these solutions is continuously dropwise added to a solvent (an aqueous solvent) (as charged into the reaction vessel and, if necessary, adjusted to a predetermined temperature) over a predetermined dropwise addition period of time. A portion of the aqueous solvent may also be dropwise added afterward separately from the initially charged solvent as beforehand charged into the vessel in the reaction system.

However, the present invention should not be limited to the above. For example, as to such as the dropwise addition method, it is fitly modifiable, in such a range as does not damage the functions and effects of the present invention, as follows: even though the dropwise addition is not continuously carried out, the dropwise addition may be carried out intermittently some subdivided times; and, as to the monomer (II), its portion or entirety can be initially charged (in other words, it is also possible to regard the entirety or its portion as having been dropwise added at once at the beginning of the polymerization); and, also as to the dropwise addition rate (amount as dropwise added), the dropwise addition may be carried out while the dropwise addition rate (amount as dropwise added) is kept constant (a constant amount) from the beginning of the dropwise addition to its end; and the dropwise addition rate (amount as dropwise added) may be varied with the passage of time according to such as the polymerization temperature; and besides, even though all the components being dropwise added are not dropwise added in the same way, the beginning and/or end of the dropwise addition may be staggered according to the components being dropwise added, or the dropwise addition time may be shortened or prolonged according to the components being dropwise added. In the case where the components are dropwise added in the form of solutions, the solutions being dropwise added may beforehand be heated to almost the same as the polymerization temperature of the inside of the reaction system. Thereby, in such a case where the polymerization temperature is kept constant, the variation of the temperature is so little that it is easy to adjust the temperature.

As to the dropwise addition of the persulfate and bisulfite or their solution(s), it is desirable to (dropwise) add 5 to 20 weight % of the persulfate and bisulfite or their solution(s) within 60 minutes, favorably within 30 minutes, more favorably within 10 minutes, from the beginning of the polymerization, for the purpose of lowering the initial molecular weight because the molecular weight at the initial stage of the polymerization has a great influence on the final molecular weight. This is particularly effective in the case where the polymerization is initiated at room temperature.

The total dropwise addition time during the polymerization needs to be a long time of 60 to 600 minutes, favorably 90 to 480 minutes, more favorably 120 to 420 minutes, because it is more important to lower the polymerization temperature to thereby inhibit the generation of the sulfur dioxide gas to thereby prevent the formation of the impurities. However, this can be said to be an extremely significant counter-method if considering the above problems that occur in the production process and considering that the enhancement of the performance of the polymer as obtained can be achieved. In the case where the total dropwise addition time is shorter than 60 minutes, it is difficult to efficiently produce the effects due to the persulfate solution and bisulfite solution to be added as the polymerization initiator. Accordingly, it is difficult to succeed in introducing the sulfur-containing group (e.g. the sulfonic acid group) into the end or side chain of the resultant poly ((meth)acrylic acid), so that the weight-average molecular weight of this polymer tends to be high. In addition, the polymerization initiator can excessively be present because of the dropwise addition of the polymerization initiator into the reaction system in a short time, thus resulting in that the sulfur dioxide gas is generated by the decomposition of such an excessive amount of polymerization initiator and is then released outside the system or forms the impurities (However, the present inventors have found out the technical significance of carrying out the polymerization reaction in the specific range such that the polymerization temperature is low and that the amount of the polymerization initiator is small. Therefore, it can be said that there is no leading to causing such problems as previously explained in the background art portion hereof. The same as this can be said also in the case deviating from other various polymerization conditions.). On the other hand, in the case where the total dropwise addition time is longer than 600 minutes, the performance of the polymer as obtained is good because the generation of the sulfur dioxide gas is inhibited. However, the productivity of the poly((meth)acrylic acid) is so low that there is a case where its use is limited. Hereupon the total dropwise addition time refers to a period of from the beginning of the dropwise addition of the component being first dropwise added (which is not necessarily one component) until the completion of the dropwise addition of the component being finally dropwise added (which is not necessarily one component).

When the polymerization reaction has finished after the dropwise addition of the above components has finished, the concentration of the polymer in the aqueous solution is desirably not less than 35 weight %, favorably in the range of 40 to 70 weight %, more favorably 45 to 65 weight %. If the solid component concentration at the end of the polymerization reaction is such a high value of not less than 35 weight %, then the low-molecular poly(unsaturated carboxylic acid) can efficiently be obtained in such that there can be omitted a concentration step which is occasionally necessary in conventional production processes. Accordingly, its production efficiency can greatly be raised. As a result, the productivity can greatly be enhanced.

Hereupon, in the case where the above solid component concentration is less than 35 weight %, the productivity of the poly(unsaturated carboxylic acid) occasionally cannot be enhanced greatly. Its reason is, for example, that it is difficult to omit the concentration step.

When the solid component concentration is raised to the above degree in the polymerization reaction system, conventional methods involve problems such that: the viscosity of the reaction solution remarkably rises with the progress of the polymerization reaction, and the weight-average molecular weight of the polymer as obtained is also greatly high. However, in the present invention, the polymerization reaction is carried out under conditions where: the pH in the acidic region (at 25° C.) is in the range of 1 to 6, and the neutralization degree is in the range of 1 to 25 mol %. Therefore, there can be inhibited the rise of the viscosity of the reaction solution even with the progress of the polymerization reaction. Accordingly, the low-molecular polymer can be obtained even if the polymerization reaction is carried out under high-concentration conditions, so that the production efficiency of the polymer can greatly be raised.

Hereupon, when the polymerization reaction has finished (when the polymerization time has ended) may be when the dropwise addition of all the components being dropwise added has finished. However, it favorably refers to when a predetermined aging time has passed (when the polymerization has been completed) thereafter.

The above aging time is usually in the range of 1 to 120 minutes, favorably 5 to 60 minutes, more favorably 10 to 30 minutes. In the case where the aging time is shorter than 1 minute, the monomer component may remain because of the insufficient aging, and therefore there is a possibility that impurities derived from the residual monomer are formed to cause such as the deterioration of the performance. On the other hand, in the case where the aging time is longer than 120 minutes, there is a possibility that the polymer solution may be colored, and besides, it is uneconomical to further expose the polymer solution to the polymerization temperature, because the polymerization has already been completed.

The duration of the aging is within the above polymerization reaction period and is included in the duration of the polymerization. Therefore the above polymerization temperature is applied to the aging. Accordingly, the temperature hereupon may be kept at a definite temperature (favorably at the temperature as is at the end of the dropwise addition) or may be varied with the passage of time during the aging. Accordingly, the polymerization time refers to the sum of the above total dropwise addition time and the above aging time. Namely, it refers to the time as required from the beginning of the first dropwise addition until the end of the aging.

In the present invention production process for a poly(unsaturated carboxylic acid), because the polymerization is carried out under the acidic conditions, the neutralization degree (final neutralization degree) of the resultant poly(unsaturated carboxylic acid) can be set in a predetermined range by fitly adding an appropriate alkaline component as a post-treatment after the end of the polymerization when the occasion demands.

As to the final neutralization degree, for example, in the case where the polymer is used as a detergent builder for such as weak acidic detergents that are said to be friendly to the bare skin, the polymer may be used as it is acidic without being neutralized. In addition, in the case where the polymer is used for such as neutral detergents or alkaline detergents, the polymer may be used after neutralizing the polymer with an alkaline component as the post-treatment so that the neutralization degree will not be less than 90 mol %. Thus, the final neutralization degree differs according to the uses of the polymer. Accordingly, there should be no especial limitation on the final neutralization degree. The final neutralization degree can be set in an extremely wide range of 1 to 100 mol %. Particularly, in the case where the polymer is used as an acidic polymer, the final neutralization degree is favorably in the range of 1 to 75 mol %, more favorably 5 to 70 mol %. In the case where the polymer is used as a neutral or alkaline polymer, the final neutralization degree is favorably in the range of 75 to 100 mol %, more favorably 85 to 99 mol %. In addition, in the case where the final neutralization degree is more than 99 mol % when the polymer is used as the neutral or alkaline polymer, there is a possibility that the aqueous polymer solution may be colored.

Representative examples of the above alkaline component include: alkaline metal hydroxides, such as sodium hydroxide and potassium hydroxide; alkaline earth metal hydroxides, such as calcium hydroxide and magnesium hydroxide; ammonia; and organic amines, such as monoethanolamine, diethanolamine and triethanolamine. The above alkaline component may be used either alone respectively or in combinations with each other.

Incidentally, the final neutralization degree can be set by carrying out desalination treatment of the poly(unsaturated carboxylic acid) as obtained by conventional perfect or partial neutralization methods. However, in this case, the uses of the polymer are occasionally limited because the addition of the desalination step complicates the production process and further raises the production costs. In the case where, as mentioned above, the polymer is used as it is acidic without being neutralized, there occasionally remains the toxic sulfur dioxide gas ($SO_2$ gas) in the internal atmosphere of the reaction system because the inside of the reaction system is acidic. In such a case, it is desirable to destroy (decompose) the sulfur dioxide gas by adding peroxides such as hydrogen peroxide or to purge away the sulfur dioxide gas by introducing (blowing) air or nitrogen gas.

In addition, the present invention production process for a sulfur-containing poly(unsaturated carboxylic acid) may be carried out either in a batch manner or in a continuous manner.

—Uses of Sulfur-Containing Poly(Unsaturated Carboxylic Acid)—

In the present invention sulfur-containing poly(unsaturated carboxylic acid), the sulfonic acid group is introduced into its end. If the sulfonic acid group is introduced into the molecular end, then the dispersibility and gelation resistance are good even though the molecular weight is comparatively large. In spite of the large molecular weight, the gelation resistance is very good.

The present invention sulfur-containing poly(unsaturated carboxylic acid) is excellent in various properties such as dispersibility, chelating ability, and gelation resistance. In addition, because the amount of the initiator as used is small, the impurities content is low and the production costs are also low.

The present invention sulfur-containing poly(unsaturated carboxylic acid) having such characteristics is very useful in various uses such as detergent builders, inorganic-pigment dispersants, and scale inhibitors.

In the case where the present invention sulfur-containing poly(unsaturated carboxylic acid) is used for kaolin dispersants, its weight-average molecular weight (Mw) is favorably in the range of 500 to 3,000, more favorably 700 to 2,700, still more favorably 1,000 to 2,500, most favorably 1,200 to 2,300. In the case where the weight-average molecular weight (Mw) of the sulfur-containing poly(unsaturated carboxylic acid) is larger than 3,000, there is a tendency such that: when the polymer is used for preparation of a kaolin slurry, a large amount of polymer is needed for lowering the slurry viscosity.

The present invention kaolin dispersant comprising the sulfur-containing poly(unsaturated carboxylic acid) as an essential component may be mixed with a water-soluble polymer other than the poly(unsaturated carboxylic acid) having a sulfonic acid group at its end, in such a range as does not damage the effects of the present invention. The mixing ratio of the water-soluble polymer is usually in the range of 0 to 10 weight %, favorably 0 to 5 weight %, more favorably 0 to 3 weight %.

It is also possible that the present invention kaolin dispersant comprising the sulfur-containing poly(unsaturated carboxylic acid) as an essential component is mixed with such as emulsion latexes, viscosity-adjusting agents, perfumes, antioxidants, ultraviolet-ray-absorbing agents, fungicides, and antiseptic agents in such a range as does not damage the effects of the present invention.

In the case where the present invention sulfur-containing poly(unsaturated carboxylic acid) is used for detergent builders, its weight-average molecular weight (Mw) is favorably in the range of 500 to 4,500, more favorably 600 to 3,000, still more favorably 700 to 2,500, most favorably 800 to 2,000, particularly most favorably 800 to 1,500. The conception of the detergent builder hereupon includes such as detergents for clothes, detergents for various hard surfaces, detergents for automatic dish-washing machines, detergents for dish washing, and detergent for toilets and baths.

The detergent builder favorably comprises the present invention sulfur-containing poly(unsaturated carboxylic acid) in an amount of 10 to 100 weight %, more favorably 20 to 90 weight %, still more favorably 30 to 80 weight %, most favorably 40 to 70 weight %. This mixing ratio is calculated by excluding water in the case where the detergent builder contains the water.

The clay dispersibility of the sulfur-containing poly(unsaturated carboxylic acid) as used for the present invention detergent builder is favorably not less than 0.5, more favorably not less than 0.6, particularly favorably not less than 0.7, most favorably not less than 0.8, under high-hardness water. In addition, the calcium ion scavengeability of the above polymer is favorably not less than 150 $mgCaCO_3/g$, more favorably not less than 160 $mgCaCO_3/g$, particularly favorably not less than 170 $mgCaCO_3/g$, most favorably not less than 180 $mgCaCO_3/g$. Hereupon, the definitions of the clay dispersibility and the calcium ion scavengeability are stated in the below-mentioned description of examples of some preferred embodiments.

The present invention detergent builder may be mixed with publicly known other detergent builders and then used. Although there is no especial limitation on such other detergent builders, examples thereof include sodium citrate, sodium tripolyphosphate, sodium pyrophosphate, sodium silicate, mirabilite, sodium carbonate, sodium nitrilotriacetate, sodium ethylenediaminetetraacetate, potassium ethylenediaminetetraacetate, zeolite, carboxyl derivatives of polysaccharides, and water-soluble polymers.

Examples of the above water-soluble polymers include water-soluble polycarboxylic polymers other than the present invention sulfur-containing poly(unsaturated carboxylic acid). Examples of such water-soluble polycarboxylic polymers include poly((meth)acrylic acid) ((meth)acrylic polymers) (and salts thereof), acrylic acid/maleic acid copolymers (acrylic/maleic copolymers) (and salts thereof), poly(α-hydroxyacrylic acid) (α-hydroxyacrylic polymers) (and salts thereof), acrylic acid/hydroxyl-group-containing monomer copolymers (acrylic/hydroxyl-group-containing monomeric copolymers) (and salts thereof), methacrylic acid/hydroxyl-group-containing monomer copolymers (methacrylic/hydroxyl-group-containing monomeric copolymers) (and salts thereof), and acrylic acid/unsaturated sulfonic acid copolymers (acrylic/unsaturated sulfonic copolymers) (and salts thereof). These may be used either alone respectively or in combinations with each other. Of these polymers, the poly(acrylic acid) (acrylic polymers) (and salts thereof) and the acrylic acid/maleic acid copolymers (acrylic/maleic copolymers) (and salts thereof) are particularly favorable.

The poly(acrylic acid) (acrylic polymers) (and salts thereof) are such that: the content of the structural unit as derived from the acrylic acid is not less than 90 mol %, and the content of the structural unit as derived from another copolymerizable monomer is not more than 10 mol %. Although not especially limited, yet the weight-average molecular weight of the poly(acrylic acid) (acrylic polymers) (and salts thereof) is favorably in the range of 500 to 4,500, more favorably 700 to 4,000, more favorably 800 to 3,500, particularly favorably 900 to 3,000, most favorably 1,000 to 2,500. The calcium ion scavengeability of the poly(acrylic acid) (acrylic polymers) (and salts thereof) is favorably not less than 200 $mgCaCO_3/g$, more favorably not less than 230 $mgCaCO_3/g$, most favorably not less than 250 $mgCaCO_3/g$. The clay dispersibility of the poly(acrylic acid) (acrylic polymers) (and salts thereof) is favorably not less than 0.20, more favorably not less than 0.25, still more favorably not less than 0.30, most favorably not less than 0.35, under high-hardness water.

The poly(acrylic acid) (acrylic polymers) (and salts thereof) can be added in the range of favorably (1-100)/(99-0), more favorably (5-100)/(95-0), still more favorably (10-100)/(90-0), most favorably (20-100)/(80-0), in weight ratio to the present invention sulfur-containing poly(unsaturated carboxylic acid).

The acrylic acid/maleic acid copolymers (acrylic/maleic copolymers) (and salts thereof) as jointly used are favorably such that the maleic acid (and salts thereof) content is in the range of 5 to 90 mol % per total 100 mol % of the acrylic acid (and salts thereof) and the maleic acid (and salts thereof), and that the product (MA×Mw) of the weight-average molecular weight Mw of the above copolymers (and salts thereof) and the maleic acid (and salts thereof) content [MA (mol %)] of the above copolymers (and salts thereof) is not more than 450,000. Hereupon, the above MA is favorably in the range of 10 to 85 mol %, more favorably 15 to 80 mol %, still more favorably 20 to 70 mol %, most favorably 25 to 60 mol %, and the above weight-average molecular weight Mw is favorably in the range of 1,000 to 90,000, more favorably 1,500 to 70,000, still more favorably 2,000 to 50,000, yet still more favorably 2,500 to 30,000, most favorably 3,000 to 20,000.

In the case where the acrylic acid/unsaturated sulfonic acid copolymers (acrylic/unsaturated sulfonic copolymers) (and salts thereof) are used, they are added in the range of favorably (10-100)/(90-0), more favorably (20-100)/(80-0), still more favorably (30-100)/(70-0), most favorably (50-100)/(50-0), in weight ratio to the present invention sulfur-containing poly(unsaturated carboxylic acid). Examples of the unsaturated sulfonic acid include 3-allyloxy-2-hydroxypropanesulfonic acid.

The present invention detergent builder may be in a powdery form such as lump, powder, sol, and gel, or may be in the form of a solution (e.g. aqueous solution).

If the present invention detergent builder is used for liquid detergents in an amount of not smaller than 0.5 weight %, this detergent builder is very excellent as such for liquid detergents in that: the detergent builder is so excellent in the compatibility with surfactants as to give high-concentrated liquid detergents. The detergent builder is so excellent in the compatibility with surfactants as to give good transparency when used for liquid detergents and therefore as to be able to prevent a problem of separation of the liquid detergents caused by turbidity. In addition, the above excellence in the compatibility can give high-concentrated liquid detergents and also leads to the enhancement of the detergency of liquid detergents.

(Effects and Advantages of the Invention):

In the present invention, when the unsaturated carboxylic acid is polymerized in the presence of the polymerization initiator to thereby obtain the poly(unsaturated carboxylic acid), the combination of the persulfate and bisulfite is used as the polymerization initiator, wherein the amount of the polymerization initiator is properly adjusted, and the polymerization temperature is also properly controlled. Therefore, there can be obtained the sulfur-containing poly(unsaturated carboxylic acid) which has a weight-average molecular weight (Mw) of 500 to 4,500 and a molecular weight distribution (Mw/Mn) of not more than 2.5, and which has the sulfonic acid group at its end. This sulfur-containing poly(unsaturated carboxylic acid) can give useful detergent builders and useful kaolin dispersants by making them contain this polymer as an essential component.

DETAILED DESCRIPTION OF THE PREFERRED EMBODIMENTS

Hereinafter, the present invention is more specifically illustrated by the following examples of some preferred embodiments in comparison with comparative examples not according to the present invention. However, the present invention is not limited to these examples in any way. Incidentally, hereinafter, for convenience, the unit "liter(s)" may be referred to simply as "L". In addition, the unit may be referred to simply as "%".

—Part 1—

EXAMPLE 1-1

First of all, 150 g of pure water was charged into a SUS-made separable flask of 5 L in capacity as equipped with a reflux condenser and a stirrer, and then the flask was heated to 90° C. under stirred conditions. Next, under stirred conditions, 285.7 g of 35% aqueous sodium bisulfite solution (hereinafter abbreviated to 35% SBS) began to be dropwise added into the polymerization reaction system as conditioned at a constant temperature of about 90° C. Subsequently, after 10 minutes from the beginning of the dropwise addition of the 35% SBS, the following components began to be dropwise added: 900 g of 80% aqueous acrylic acid solution (hereinafter abbreviated to 80% AA), 41.67 g of 48% aqueous sodium hydroxide solution (hereinafter abbreviated to 48% NaOH), and 142.9 g of 35% aqueous sodium persulfate solution (hereinafter abbreviated to 35% NaPS). As to their respective dropwise addition times, those of the 35% SBS, the 80% AA, and the 48% NaOH were the duration of 180 minutes, and that of the 35% NaPS was the duration of 190 minutes. Also, the dropwise addition rates of the above components were kept constant for the duration of their respective dropwise additions, thus carrying out the dropwise additions continuously.

After the end of the dropwise addition of the 35% NaPS, the resultant reaction solution was kept at 90° C. for another 30 minutes to age it, thereby completing the polymerization. After the completion of the polymerization, the reaction solution was left cooling. Then, 750 g of the 48% NaOH was gradually added dropwise to the reaction solution under stirred conditions to neutralize the resultant reaction product, thus obtaining a sodium salt of poly(acrylic acid) having a solid component concentration of 48% and a final neutralization degree of 95 mol %. Its weight-average molecular weight and molecular weight distribution are as listed in Table 1.

It was decided that this polymer would, as it was, be used as a kaolin dispersant (dispersant (1-1)).

EXAMPLE 1-2

First of all, 97 g of pure water was charged into a SUS-made separable flask of 5 L in capacity as equipped with a reflux condenser and a stirrer, and then the flask was heated to 90° C. under stirred conditions. Next, under stirred conditions, 214.3 g of 35% SBS began to be dropwise added into the polymerization reaction system as conditioned at a constant temperature of about 90° C. Subsequently, after 10 minutes from the beginning of the dropwise addition of the 35% SBS, the following components began to be dropwise added: 450 g of 80% AA, 20.8 g of 48% NaOH, and 166.7 g of 15% NaPS. As to their respective dropwise addition times, those of the 35% SBS, the 80% AA, and the 48% NaOH were the duration of 180 minutes, and that of the 15% NaPS was the duration of 190 minutes. Also, the dropwise addition rates of the above components were kept constant for the duration of their respective dropwise additions, thus carrying out the dropwise additions continuously.

After the end of the dropwise addition of the 15% NaPS, the resultant reaction solution was kept at 90° C. for another 30 minutes to age it, thereby completing the polymerization. After the completion of the polymerization, the reaction solution was left cooling. Then, 375 g of the 48% NaOH was gradually added dropwise to the reaction solution under stirred conditions to neutralize the resultant reaction product, thus obtaining a sodium salt of poly(acrylic acid) having a solid component concentration of 43% and a final neutralization degree of 95 mol %. Its weight-average molecular weight and molecular weight distribution are as listed in Table 1.

It was decided that this polymer would, as it was, be used as a kaolin dispersant (dispersant (1-2)).

COMPARATIVE EXAMPLE 1-1

First of all, 350 g of pure water was charged into a SUS-made separable flask of 5 L in capacity as equipped with a reflux condenser and a stirrer, and then the flask was heated to 90° C. under stirred conditions. Next, under stirred conditions, 143 g of 35% SBS, 900 g of 80% AA, 41.7 g of 48% NaOH, and 133 g of 15% NaPS were dropwise added into the polymerization reaction system as conditioned at a constant temperature of about 90° C. As to their respective dropwise addition times, that of the 35% SBS was the duration of 290 minutes, those of the 80% AA and the 48% NaOH were the duration of 300 minutes, and that of the 15% NaPS was the duration of 310 minutes. Also, the dropwise addition rates of the above components were kept constant for the duration of their respective dropwise additions, thus carrying out the dropwise additions continuously.

After the end of the dropwise addition of the 15% NaPS, the resultant reaction solution was kept at 90° C. for another 30 minutes to age it, thereby completing the polymerization. After the completion of the polymerization, the reaction solution was left cooling. Then, 750 g of the 48% NaOH was gradually added dropwise to the reaction solution under stirred conditions to neutralize the resultant reaction product, thus obtaining a sodium salt of poly(acrylic acid) having a solid component concentration of 43% and a final neutralization degree of 95 mol %. Its weight-average molecular weight and molecular weight distribution are as listed in Table 1.

It was decided that this polymer would, as it was, be used as a kaolin dispersant (comparative dispersant (1-1)).

COMPARATIVE EXAMPLE 1-2

First of all, 1,385 g of pure water was charged into a SUS-made separable flask of 5 L in capacity as equipped with a reflux condenser and a stirrer, and then the flask was heated under stirred conditions until coming into a boiling point reflux state. Next, under stirred conditions, 61.1 g of 35% aqueous hydrogen peroxide solution (hereinafter abbreviated to 35% $H_2O_2$) and 106.7 g of 15% NaPS began to be dropwise added into the polymerization reaction system being in the boiling point reflux state. Subsequently, after 5 minutes from the beginning of the dropwise addition of the 35% $H_2O_2$, the following components began to be dropwise added: 450 g of 80% AA and 375 g of 48% NaOH. As to their respective dropwise addition times, that of the 35% $H_2O_2$ was the duration of 180 minutes, that of the 15% NaPS was the duration of 250 minutes, and those of the 80% AA and the 48% NaOH were the duration of 235 minutes. Also, the dropwise addition rates of the above components were kept constant for the duration of their respective dropwise additions, thus carrying out the dropwise additions continuously.

After the end of the dropwise addition of the 15% NaPS, while the boiling point reflux state was still kept, 25 g of the 48% NaOH was gradually added dropwise to the reaction solution under stirred conditions to neutralize the resultant reaction product. While the boiling point reflux state was still kept for 90 minutes, the reaction solution was aged to complete the polymerization, thus obtaining a sodium salt of poly(acrylic acid) having a solid component concentration of 21% and a final neutralization degree of 96 mol %. Its weight-average molecular weight and molecular weight distribution are as listed in Table 1.

It was decided that this polymer would, as it was, be used as a kaolin dispersant (comparative dispersant (1-2)).

The results of the evaluation of the kaolin dispersibility and kaolin-slurry storage stability of the kaolin dispersants as obtained in the above Examples and Comparative Examples are listed in Table 1. The kaolin dispersibility test and the storage stability test were carried out in the following ways.

<Kaolin Dispersibility Test>:

(1) Into a container of 600 ml, there were placed 171.4 g of ion-exchanged water, 2.1 g of $Na_2CO_3$ (for pH adjustment), and the dispersant of 0.09% (in terms of solid component concentration). Thereafter, kaolin was added thereto little by little under stirring with a homomixer (2,000 rpm).

(2) After the above addition of kaolin had been carried out in such an amount that the slurry concentration would be 70%, the stirring was carried out at a homomixer revolution rate of 4,000 rpm for 10 minutes.

(3) The resultant slurry was filtrated with a wire net of 200 mesh, and thereafter the slurry viscosity was measured at 30 rpm using a spindle No. 2 with a B-type viscometer (digital viscometer of Model No. DV-I+, produced by Brookfield Co., Ltd.).

<Storage Stability Test>:

The slurry as prepared in the above kaolin dispersibility test was stored by being left stationary in a container having a lid. Then, after one month, the viscosity was measured with the B-type viscometer.

TABLE 1

| | Dispersant | End group | Weight-average molecular weight (Mw) | Molecular weight distribution (Mw/Mn) | B-type viscosity (mPa · s) That day | After one month |
|---|---|---|---|---|---|---|
| Example 1-1 | Dispersant (1-1) | Sulfonic acid group | 2000 | 1.8 | 270 | 410 |
| Example 1-2 | Dispersant (1-2) | Sulfonic acid group | 1400 | 1.6 | 260 | 370 |
| Comparative Example 1-1 | Comparative dispersant (1-1) | Sulfonic acid group | 5900 | 2.7 | 380 | 1600 |
| Comparative Example 1-2 | Comparative dispersant (1-2) | Hydroxyl group | 2100 | 1.9 | 530 | 1100 |

As is shown in Table 1, when the present invention sulfur-containing poly(unsaturated carboxylic acid) is, as it is, used as the dispersant to prepare the kaolin slurry, this polymer lowers the slurry viscosity during the dispersion and therefore can make the handling of the slurry easy. The resultant slurry involves only a small rise of the viscosity when left stationary for one month, and is therefore excellent in the storage stability.

—Part 2—

In the following Examples and Comparative Examples, the weight-average molecular weights (Mw) of the polymers were measured in the aforementioned way, and the solid component concentrations in the aqueous solutions of the polymers were measured in the following way.

<Measurement of Solid Component Concentration>:

The solid component concentration was defined as a nonvolatile component concentration resultant from drying 1 g of aqueous (co)polymer solution with a hot-wind dryer of 170° C. for 1 hour.

EXAMPLE 2-1

First of all, 145 g of pure water was charged into a SUS-made separable flask of 2.5 L in capacity as equipped with a reflux condenser and a stirrer, and then the flask was heated to 90° C. under stirred conditions. Next, under stirred conditions, 405 g of 80% aqueous acrylic acid solution (hereinafter abbreviated to 80% AA), 127 g of 37% aqueous sodium acrylate solution (hereinafter abbreviated to 37% SA), 80 g of 25% aqueous sodium persulfate solution (hereinafter abbreviated to 25% NaPS), and 85.7 g of 35% aqueous sodium bisulfite solution (hereinafter abbreviated to 35% SBS) began to be dropwise added into the polymerization reaction system as conditioned at a constant temperature of about 90° C. As to their respective dropwise addition times, those of the 80% AA and the 37% SA were the duration of 240 minutes, and those of the 25% NaPS and the 35% SBS were the duration of 250 minutes. Also, the dropwise addition rates of the above components were kept constant for the duration of their respective dropwise additions, thus carrying out the dropwise additions continuously.

After the end of the dropwise addition of the 25% NaPS, the resultant reaction solution was kept at 90° C. for another 30 minutes to age it, thereby completing the polymerization. After the completion of the polymerization, the reaction solution was left cooling. Then, 333.3 g of 48% aqueous sodium hydroxide solution (hereinafter abbreviated to 48% NaOH) was gradually added dropwise to the reaction solution under stirred conditions to neutralize the resultant reaction product, thus obtaining a sulfur-containing poly(unsaturated carboxylic acid) (polymer (2-1)) in the form of an aqueous solution, wherein the resultant polymer had a solid component concentration of 45%, a final neutralization degree of 90 mol %, a weight-average molecular weight Mw of 4,100, and a molecular weight distribution of 2.4.

EXAMPLE 2-2

First of all, 150 g of pure water and 0.0455 g of Mohr's salt were charged into a SUS-made separable flask of 5 L in capacity as equipped with a reflux condenser and a stirrer, and then the flask was heated to 90° C. under stirred conditions. Next, under stirred conditions, 228.6 g of 35% SBS began to be dropwise added into the polymerization reaction system as conditioned at a constant temperature of about 90° C. Subsequently, after 10 minutes from the beginning of the dropwise addition of the 35% SBS, the following components began to be dropwise added: 900 g of 80% AA, 41.7 g of 48% NaOH, and 85.7 g of 35% aqueous sodium persulfate solution (hereinafter abbreviated to 35% NaPS). As to their respective dropwise addition times, those of the 35% SBS, the 80% AA, and the 48% NaOH were the duration of 180 minutes, and that of the 35% NaPS was the duration of .190 minutes. Also, the dropwise addition rates of the above components were kept constant for the duration of their respective dropwise additions, thus carrying out the dropwise additions continuously.

After the end of the dropwise addition of the 35% NaPS, the resultant reaction solution was kept at 90° C. for another 30 minutes to age it, thereby completing the polymerization. After the completion of the polymerization, the reaction solution was left cooling. Then, 750 g of the 48% NaOH was gradually added dropwise to the reaction solution under stirred conditions to neutralize the resultant reaction product, thus obtaining a sulfur-containing poly(unsaturated carboxylic acid) (polymer (2-2)) in the form of an aqueous solution, wherein the resultant polymer had a solid component concentration of 50%, a final neutralization degree of 95 mol %, a weight-average molecular weight Mw of 2,500, and a molecular weight distribution of 2.0.

EXAMPLE 2-3

First of all, 150 g of pure water was charged into a SUS-made separable flask of 5 L in capacity as equipped with a reflux condenser and a stirrer, and then the flask was heated to 90° C. under stirred conditions. Next, under stirred conditions, 285.7 g of 35% SBS began to be dropwise added into the polymerization reaction system as conditioned at a constant temperature of about 90° C. Subsequently, after 10 minutes from the beginning of the dropwise addition of the 35% SBS, the following components began to be dropwise added: 900 g of 80% AA, 41.67 g of 48% NaOH, and 142.9 g of 35% NaPS. As to their respective dropwise addition times, those of the 35% SBS, the 80% AA, and the 48% NaOH were the duration of 180 minutes, and that of the 35% NaPS was the duration of 190 minutes. Also, the dropwise addition rates of the above components were kept constant for the duration of their respective dropwise additions, thus carrying out the dropwise additions continuously.

After the end of the dropwise addition of the 35% NaPS, the resultant reaction solution was kept at 90° C. for another 30 minutes to age it, thereby completing the polymerization. After the completion of the polymerization, the reaction solution was left cooling. Then, 750 g of the 48% NaOH was gradually added dropwise to the reaction solution under stirred conditions to neutralize the resultant reaction product, thus obtaining a sulfur-containing poly(unsaturated carboxylic acid) (polymer (2-3)) in the form of an aqueous solution, wherein the resultant polymer had a solid component concentration of 48%, a final neutralization degree of 95 mol %, a weight-average molecular weight Mw of 2,000, and a molecular weight distribution of 1.8.

EXAMPLE 2-4

First of all, 320 g of pure water and 0.0512 g of Mohr's salt were charged into a SUS-made separable flask of 5 L in capacity as equipped with a reflux condenser and a stirrer, and then the flask was heated to 90° C. under stirred conditions. Next, under stirred conditions, 285.7 g of 35% SBS began to be dropwise added into the polymerization reaction system as conditioned at a constant temperature of about 90° C. Subsequently, after 10 minutes from the beginning of the dropwise addition of the 35% SBS, the following components began to be dropwise added: 900 g of 80% AA, 41.7 g of 48% NaOH, and 133.3 g of 15% NaPS. As to their respective dropwise addition times, those of the 35% SBS, the 80% AA, and the 48% NaOH were the duration of 180 minutes, and that of the 15% NaPS was the duration of 190 minutes. Also, the dropwise addition rates of the above components were kept constant for the duration of their respective dropwise additions, thus carrying out the dropwise additions continuously.

After the end of the dropwise addition of the 15% NaPS, the resultant reaction solution was kept at 90° C. for another 30 minutes to age it, thereby completing the polymerization. After the completion of the polymerization, the reaction solution was left cooling. Then, 750 g of the 48% NaOH was gradually added dropwise to the reaction solution under stirred conditions to neutralize the resultant reaction product, thus obtaining a sulfur-containing poly(unsaturated carboxylic acid) (polymer (2-4)) in the form of an aqueous solution, wherein the resultant polymer had a solid component concentration of 45%, a final neutralization degree of 95 mol %, a weight-average molecular weight Mw of 1,700, and a molecular weight distribution of 1.7.

EXAMPLE 2-5

First of all, 97 g of pure water was charged into a SUS-made separable flask of 2.5 L in capacity as equipped with a reflux condenser and a stirrer, and then the flask was heated to 90° C. under stirred conditions. Next, under stirred conditions, 214.3 g of 35% SBS began to be dropwise added into the polymerization reaction system as conditioned at a constant temperature of about 90° C. Subsequently, after 10 minutes from the beginning of the dropwise addition of the 35% SBS, the following components began to be dropwise added: 450 g of 80% AA, 20.8 g of 48% NaOH, and 166.7 g of 15% NaPS. As to their respective dropwise addition times, those of the 35% SBS, the 80% AA, and the 48% NaOH were the duration of 180 minutes, and that of the 15% NaPS was the duration of 190 minutes. Also, the dropwise addition rates of the above components were kept constant for the duration of their respective dropwise additions, thus carrying out the dropwise additions continuously.

After the end of the dropwise addition of the 15% NaPS, the resultant reaction solution was kept at 90° C. for another 30 minutes to age it, thereby completing the polymerization. After the completion of the polymerization, the reaction solution was left cooling. Then, 375 g of the 48% NaOH was gradually added dropwise to the reaction solution under stirred conditions to neutralize the resultant reaction product, thus obtaining a sulfur-containing poly(unsaturated carboxylic acid) (polymer (2-5)) in the form of an aqueous solution, wherein the resultant polymer had a solid component concentration of 43%, a final neutralization degree of 95 mol %, a weight-average molecular weight Mw of 1,400, and a molecular weight distribution of 1.6.

EXAMPLE 2-6

First of all, 125 g of pure water and 0.0912 g of Mohr's salt were charged into a SUS-made separable flask of 2.5 L in capacity as equipped with a reflux condenser and a stirrer, and then the flask was heated to 90° C. under stirred conditions. Next, under stirred conditions, 214.3 g of 35% SBS began to be dropwise added into the polymerization reaction system as conditioned at a constant temperature of about 90° C. Subsequently, after 10 minutes from the beginning of the dropwise addition of the 35% SBS, the following components began to be dropwise added: 450 g of 80% AA, 20.8 g of 48% NaOH, and 100 g of 15% NaPS. As to their respective dropwise addition times, those of the 35% SBS, the 80% AA, and the 48% NaOH were the duration of 180 minutes, and that of the 15% NaPS was the duration of 190 minutes. Also, the dropwise addition rates of the above components were kept constant for the duration of their respective dropwise additions, thus carrying out the dropwise additions continuously.

After the end of the dropwise addition of the 15% NaPS, the resultant reaction solution was kept at 90° C. for another 30 minutes to age it, thereby completing the polymerization. After the completion of the polymerization, the reaction solution was left cooling. Then, 387.5 g of the 48% NaOH was gradually added dropwise to the reaction solution under stirred conditions to neutralize the resultant reaction product, thus obtaining a sulfur-containing poly(unsaturated carboxylic acid) (polymer (2-6)) in the form of an aqueous solution, wherein the resultant polymer had a solid component concentration of 45%, a final neutralization degree of 98 mol %, a weight-average molecular weight Mw of 1,100, and a molecular weight distribution of 1.4.

EXAMPLE 2-7

First of all, 160 g of pure water and 0.0291 g of Mohr's salt were charged into a SUS-made separable flask of 2.5 L in capacity as equipped with a reflux condenser and a stirrer, and then the flask was heated to 90° C. under stirred conditions. Next, under stirred conditions, 142.9 g of 35% SBS began to be dropwise added into the polymerization reaction system as conditioned at a constant temperature of about 90° C. Subsequently, after 5 minutes from the beginning of the dropwise addition of the 35% SBS, the following components began to be dropwise added: 614.3 g of 70% aqueous methacrylic acid solution (hereinafter abbreviated to 70% MAA), 20.8 g of 48% NaOH, and 66.7 g of 15% NaPS. As to their respective dropwise addition times, those of the 35% SBS, the 70% MAA, and the 48% NaOH were the duration of 180 minutes, and that of the 15% NaPS was the duration of 185 minutes.

Also, the dropwise addition rates of the above components were kept constant for the duration of their respective dropwise additions, thus carrying out the dropwise additions continuously.

After the end of the dropwise addition of the 15% NaPS, the resultant reaction solution was kept at 90° C. for another 30 minutes to age it, thereby completing the polymerization. After the completion of the polymerization, the reaction solution was left cooling. Then, 375 g of the 48% NaOH was gradually added dropwise to the reaction solution under stirred conditions to neutralize the resultant reaction product, thus obtaining a sulfur-containing poly(unsaturated carboxylic acid) (polymer (2-7)) in the form of an aqueous solution, wherein the resultant polymer had a solid component concentration of 45%, a final neutralization degree of 95 mol %, a weight-average molecular weight Mw of 2,400, and a molecular weight distribution of 2.2.

EXAMPLE 2-8

There was produced a copolymer of maleic acid/acrylic acid=5/95 in molar ratio. Specifically, 190 g of pure water, 29.4 g of maleic anhydride, and 2.5 g of 48% NaOH were initially charged into a SUS-made separable flask of 2.5 L in capacity as equipped with a thermometer, a stirrer, and a reflux condenser, and then the contents of the flask were heated to 90° C. under stirred conditions. Next, while 90° C. was maintained under stirred conditions, 513 g of 80% AA, 23.8 g of 48% NaOH, 200.0 g of 15% NaPS, and 171.4 g of 35% SBS were dropwise added from their respective dropping nozzles continuously at their respective constant rates over periods of 180 minutes, 180 minutes, 185 minutes, and 175 minutes respectively from the beginning of the polymerization. Then, the polymerization had been completed by still maintaining 90° C. over a period of 30 minutes after the end of all the dropwise additions. Thereafter, 420 g of 48% NaOH was added to the resultant reaction mixture to neutralize it, thus obtaining a sulfur-containing poly(unsaturated carboxylic acid) (polymer (2-8)) in the form of an aqueous solution, wherein the resultant polymer had a solid component concentration of 45%, a final neutralization degree of 95 mol %, a weight-average molecular weight Mw of 3,600, and a molecular weight distribution of 2.5.

COMPARATIVE EXAMPLE 2-1

First of all, 175 g of pure water was initially charged into a SUS-made separable flask of 2.5 L in capacity as equipped with a thermometer, a stirrer, and a reflux condenser, and then the contents of the flask were heated to 90° C. under stirred conditions. Next, while 90° C. was maintained under stirred conditions, 450 g of 80% AA, 20.83 g of 48% NaOH, 66.7 g of 15% NaPS, and 71.4 g of 35% SBS were dropwise added from their respective dropping nozzles continuously at their respective constant rates over periods of 300 minutes, 300 minutes, 310 minutes, and 290 minutes respectively from the beginning of the polymerization. Then, the polymerization had been completed by still maintaining 90° C. over a period of 30 minutes after the end of all the dropwise additions. Thereafter, 375 g of 48% NaOH was added to the resultant reaction mixture to neutralize it, thus obtaining a sulfur-containing poly(unsaturated carboxylic acid) (comparative polymer (2-1)) in the form of an aqueous solution, wherein the resultant polymer had a solid component concentration of 45%, a final neutralization degree of 95 mol %, a weight-average molecular weight Mw of 6,000, and a molecular weight distribution of 2.7.

COMPARATIVE EXAMPLE 2-2

First of all, 560 g of pure water was initially charged into a SUS-made separable flask of 2.5 L in capacity as equipped with a thermometer, a stirrer, and a reflux condenser, and then the contents of the flask were heated under stirred conditions until coming into a boiling point reflux state. Next, while the reflux state was maintained under stirred conditions, 360 g of 80% AA, 283 g of 48% NaOH, 56 g of 15% NaPS, and 600 g of pure water were dropwise added from their respective dropping nozzles continuously at their respective constant rates over periods of 240 minutes, 240 minutes, 250 minutes, and 250 minutes respectively from the beginning of the polymerization. Then, the polymerization had been completed by still maintaining the boiling point reflux state over a period of 30 minutes after the end of all the dropwise additions. Thus, a sulfur-containing poly(unsaturated carboxylic acid) (comparative polymer (2-2)) was obtained in the form of an aqueous solution, wherein the resultant polymer had a solid component concentration of 45%, a final neutralization degree of 85 mol %, a weight-average molecular weight Mw of 5,000, and a molecular weight distribution of 2.6.

COMPARATIVE EXAMPLE 2-3

There was produced a copolymer of maleic acid/acrylic acid=5/95 in molar ratio. Specifically, 190 g of pure water, 29.4 g of maleic anhydride, and 2.5 g of 48% NaOH were initially charged into a SUS-made separable flask of 2.5 L in capacity as equipped with a thermometer, a stirrer, and a reflux condenser, and then the contents of the flask were heated to 90° C. under stirred conditions. Next, while 90° C. was maintained under stirred conditions, 513 g of 80% AA, 23.8 g of 48% NaOH, 160.0 g of 15% NaPS, and 137.1 g of 35% SBS were dropwise added from their respective dropping nozzles continuously at their respective constant rates over periods of 180 minutes, 180 minutes, 185 minutes, and 175 minutes respectively from the beginning of the polymerization. Then, the polymerization had been completed by still maintaining 90° C. over a period of 30 minutes after the end of all the dropwise additions. Thereafter, 420 g of 48% NaOH was added to the resultant reaction mixture to neutralize it, thus obtaining a sulfur-containing poly(unsaturated carboxylic acid) (comparative polymer (2-3)) in the form of an aqueous solution, wherein the resultant polymer had a solid component concentration of 45%, a final neutralization degree of 85 mol %, a weight-average molecular weight Mw of 7,200, and a molecular weight distribution of 3.0.

The sulfur-containing poly(unsaturated carboxylic acids) (polymers (2-1) to (2-8) and comparative polymers (2-1) to (2-3)) as obtained in the above Examples and Comparative Examples were evaluated by their performances as kaolin dispersants and as detergent builders. The kaolin dispersibility test is as aforementioned, and the test for the evaluation of the performance as the detergent builder is as mentioned below.

<Evaluation of Fundamental Performance as Liquid Detergent Builder for Clothes>:

As to the above polymers, the calcium ion scavengeability and the clay dispersibility under high-hardness water were examined by the below-mentioned methods. Also, the compatibility of the polymers was judged by measuring the kaolin turbidity of liquid detergents for clothes by the below-mentioned method, wherein the liquid detergents had compositions (1), (2), and (3) as listed in Table 2 below and, in the liquid detergents, there was dissolved each polymer in an amount of 1 weight %.

TABLE 2

|  | Composition (1) | Composition (2) | Composition (3) |
|---|---|---|---|
| Neopelex F-65 | 25 | 8.3 | 46 |
| Emal 270J | — | 31 | — |
| SFT-70H | 8.8 | 2.7 | 10 |
| Ethanol | 3.2 | 4.2 | 5 |
| Propylene glycol | 9.4 | 7.5 | 10 |
| Polymer | 1 | 1 | 1 |
| Pure water | Balance | Balance | Balance |
| Total | 100 | 100 | 100 |

Incidentally, in Table 2, the numerical values of the amount as added denote weight % in terms of solid component concentration or effective component concentration. In this table: Neopelex F-65 is sodium dodecylbenzenesulfonate (purity: about 65%, produced by Kao Corporation); and SFT-70H is Softanol 70H, namely, polyoxyethylene alkyl ether (produced by Nippon Shokubai Co., Ltd.); and Emal 270J denotes sodium polyoxyethylene lauryl ether sulfate (purity: about 70%, produced by Kao Corporation).

The measurement results of the calcium ion scavengeability, the clay dispersibility, and the compatibility are listed in Table 3 below.

TABLE 3

|  | Polymer | Calcium ion scavengeability (mg $CaCO_3$/g) | Clay dispersibility | Compatability Composition (1) | Composition (2) | Composition (3) |
|---|---|---|---|---|---|---|
| Example | Polymer (2-1) | 220 | 1.24 | ○ | ○ | ○ |
|  | Polymer (2-2) | 205 | 1.22 | ○ | ○ | ○ |
|  | Polymer (2-3) | 190 | 1.05 | ○ | ○ | ○ |
|  | Polymer (2-4) | 185 | 1.11 | ○ | ○ | ○ |
|  | Polymer (2-5) | 180 | 1.08 | ○ | ○ | ○ |
|  | Polymer (2-6) | 180 | 0.98 | ○ | ○ | ○ |
|  | Polymer (2-7) | 185 | 0.88 | ○ | ○ | ○ |
|  | Polymer (2-8) | 200 | 0.19 | ○ | ○ | ○ |
| Comparative Example | Comparative polymer (2-1) | 240 | 1.09 | x | x | x |
|  | Comparative polymer (2-2) | 250 | 1.15 | x | x | x |
|  | Comparative polymer (2-3) | 270 | 0.45 | x | x | x |

From the above measurement results, it has been confirmed that the present invention sulfur-containing poly(unsaturated carboxylic acid) and the liquid detergent containing this polymer are excellent in the calcium ion scavengeability, the clay dispersibility under high-hardness water, and the compatibility.

Incidentally, as to the compatibility in Table 3, the cases of the kaolin turbidity of not more than 200 mg/L were represented by ○ (good), and the cases of the kaolin turbidity of more than 200 mg/L were represented by x (poor).

<Kaolin Turbidity>:

As to the kaolin turbidity, the components were stirred sufficiently to be uniform, and then bubbles were removed, and thereafter the turbidity value was measured at 25° C. As to the turbidity value, the Turbidity (kaolin turbidity: mg/L) was measured with a turbidimeter (NDH2000, produced by Nippon Denshoku Co., Ltd.).

<Calcium Ion Scavengeability>:

Calcium ion standard solutions for drawing a calibration curve were prepared by the following steps of: preparing 50 g each of 0.01 mol/L, 0.001 mol/L, and 0.0001 mol/L aqueous solutions of calcium chloride dihydrate, and then adjusting their pH into the range of 9 to 11 with a 4.8% aqueous NaOH solution, and then adding thereto 1 mL of a 4 mol/L aqueous potassium chloride solution (hereinafter, abbreviated as "aqueous 4M-KCl solution"), and then sufficiently stirring the resultant mixture with a magnetic stirrer, thus preparing the sample solutions for drawing the calibration curve. In addition, a 0.001 mol/L aqueous solution was prepared in a necessary amount (50 g per sample) as a test calcium ion standard solution, similarly, from the calcium chloride dihydrate.

Next, 10 mg (in terms of solid component) of a test sample (polymer) was weighed out into a beaker of 100 cc, and then thereto 50 g of the above test calcium ion standard solution was added, and then the contents of the beaker were stirred with a magnetic stirrer enough. Furthermore, in the same way as of the sample solutions for drawing the calibration curve, the pH of the resultant mixture was adjusted into the range of 9 to 11 with a 4.8% aqueous NaOH solution, and then thereto 1 mL of the aqueous 4M-KCl solution was further added, thus preparing a test sample solution.

The sample solutions for drawing the calibration curve and the test sample solution, as prepared in the above ways, were measured with a calcium ion electrode ("93-20" produced by OLION Co.) and a comparative electrode ("90-01" produced by OLION Co.) using a titration apparatus ("COMTITE-550" produced by Hiranuma Sangyo Co., Ltd.).

Then, the amount of calcium ion, as scavenged by the sample (polymer), was determined by calculation from the measured values of the sample solutions for drawing the calibration curve and the test sample solution. Then, the determined amount of calcium ion, as scavenged per g of the solid component of the polymer, was denoted by the milligrams in terms of calcium carbonate, and this value was taken as the calcium ion scavengeability value.

<Clay Dispersibility Under High-hardness Water> (Under High-Hardness Water of 200 ppm in Terms of $CaCO_3$):

A buffer (1) was prepared by adding pure water to 67.56 g of glycine, 52.6 g of sodium chloride, and 2.4 g of NaOH to adjust the total weight to 600 g. To 60 g of this buffer (1), then, 0.3268 g of calcium chloride dehydrate followed by pure water was added to adjust the total weight to 1,000 g, thus preparing a buffer (2). Next, a dispersion was prepared by adding 36 g of the buffer (2) to 4 g of 0.1 weight % (in terms of solid component concentration by weight) aqueous solution of the copolymer (to be measured) and then stirring them.

A test tube (diameter: 18 mm, height: 180 mm, produced by IWAKI GLASS) was charged with 0.3 g of clay (11 types of test dust, produced by Japan Powder Industrial Technical Society (incorporated body)), and thereto 30 g of the above dispersion was thereafter added, and then the test tube was sealed.

Then, the test tube was shaken to uniformly disperse the clay, and then allowed to stand stationary for 20 hours in a dark place. After 20 hours, 5 cc of supernatant of the dispersion was sampled to measure its absorbance with a UV spectroscope (UV-1200, produced by Shimadzu Corporation; 1 cm cell, wavelength=380 nm).

The clay dispersibility test under low-hardness water was carried out in a concentration of 50 ppm in terms of $CaCO_3$.

<Evaluation of Performance as Liquid Detergent Builder for Hard Surfaces (e.g. Tableware, Toilet Stools)>:

The hard-surface detergency of a liquid detergent for hard surfaces was measured by the below-mentioned method, and besides, the kaolin turbidity of this liquid detergent was measured as the compatibility by the aforementioned method, wherein the liquid detergent had a composition as listed in Table 4 below and, in the liquid detergent, there was dissolved each polymer in an amount of 1 weight %. As to the compatibility, the cases of the kaolin turbidity of not more than 200 mg/L were represented by ○ (good), and the cases of the kaolin turbidity of more than 200 mg/L were represented by x (poor).

TABLE 4

| Composition of liquid detergent for hard surfaces | Amount as added |
|---|---|
| AES | 25 |
| SFT-70H | 5 |
| Ethanol | 10 |
| Ammonium citrate | 1 |
| Polymer | 1 |
| NaOH | pH 8-9 |
| Pure water | Balance |
| Total | 100 |

Incidentally, in Table 4, the numerical values of the amount as added denote weight % in terms of solid component concentration or effective component concentration. In Table 4, AES denotes sodium alkyl polyoxyethylene sulfate.

<Hard-surface Detergency>:

The detergency of a liquid detergent composition for hard surfaces, with which the polymer was compatible, was evaluated by a method based on JIS (K3362: method for evaluation of detergency of synthetic detergents for kitchens). The detergency was represented by ○ in the case where the decontamination was more excellent than the case of using a liquid detergent composition for hard surfaces which composition did not contain the polymer. Otherwise, the detergency was represented by x.

The measurement results of the compatibility and hard-surface detergency of the polymers are listed in Table 5 below.

TABLE 5

| | Polymer | Compatability | Hard-surface detergency |
|---|---|---|---|
| Example | Polymer (2-1) | ○ | ○ |
| | Polymer (2-2) | ○ | ○ |
| | Polymer (2-3) | ○ | ○ |
| | Polymer (2-4) | ○ | ○ |
| | Polymer (2-5) | ○ | ○ |

TABLE 5-continued

| | Polymer | Compatability | Hard-surface detergency |
|---|---|---|---|
| | Polymer (2-6) | ○ | ○ |
| | Polymer (2-7) | ○ | ○ |
| | Polymer (2-8) | ○ | ○ |
| Comparative Example | Comparative polymer (2-1) | x | — |
| | Comparative polymer (2-3) | x | — |

From the above results, it has been confirmed that: the present invention sulfur-containing poly(unsaturated carboxylic acid) is excellent in the compatibility with the liquid detergent for hard surfaces; and the liquid detergent for hard surfaces, containing the sulfur-containing poly(unsaturated carboxylic acid), is excellent in the detergency.

Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents.

What is claimed is:

1. A detergent builder, which comprises a sulfur-containing poly(unsaturated carboxylic acid), wherein the sulfur-containing poly(unsaturated carboxylic acid) comprises:
   a weight-average molecular weight (Mw) of 700 to 2500 and a molecular weight distribution (Mw/Mn) of not more than 2.5;
   with the sulfur-containing poly(unsaturated carboxylic acid) comprising a molecular end and sulfur bound to said molecular end in a form of a sulfonic acid group, and with the sulfur-containing poly (unsaturated carboxylic acid) being water-soluble;
   wherein a mixing ratio of (meth)acrylic acid in a monomer component is in the range of 90 to 100 mol % relative to an entire monomer component for the sulfur-containing poly(unsaturated carboxylic acid);
   wherein the sulfur-containing poly(unsaturated carboxylic acid) is obtained by polymerizing an unsaturated carboxylic acid in the presence of a combination of at least one persulfate and at least one bisulfite as a polymerization initiator; and
   wherein the polymerization initiator is adjusted in such a manner that: the total amount of the polymerization initiator as used is not smaller than 10 g equivalents per 1 mol of the unsaturated carboxylic acid as used, and the amount of the bisulfite accounts for not smaller than 8 g equivalents of the total amount of the polymerization initiator as used; and the polymerization temperature is controlled so as to be in the range of 25 to 90° C.;
   wherein the sulfur-containing poly(unsaturated carboxylic acid) is further obtained by polymerizing the unsaturated carboxylic acid in the presence of a heavy metal ion, wherein a content of the heavy metal ion is in a range of 0.1 to 10 ppm relative to the total weight of a polymerization reaction liquid when polymerization has been completed;
   wherein the bisulfite or its solution and the unsaturated carboxylic acid or its solution are dropwise added during polymerization, and a dropwise addition time of the bisulfite or its solution is completed earlier than completion of a dropwise addition of the unsaturated carboxylic acid or its solution by 1 to 30 minutes; and
   wherein said sulfur-containing poly(unsaturated carboxylic acid) comprises a sodium salt of poly(acrylic acid) having a sulfonic acid end group.

2. A kaolin dispersant, which comprises a sulfur-containing poly(unsaturated carboxylic acid), wherein the sulfur-containing poly(unsaturated carboxylic acid) comprises:
   a molecular end and sulfur bound to said molecular end in a form of a sulfonic acid group, and with the sulfur-containing poly (unsaturated carboxylic acid) being water-soluble;
   a weight-average molecular weight (Mw) of 700 to 2700 and a molecular weight distribution (Mw/Mn) of not more than 2.5;
   wherein a mixing ratio of (meth)acrylic acid in a monomer component is in the range of 90 to 100 mol % relative to an entire monomer component for the sulfur-containing poly(unsaturated carboxylic acid);
   wherein the sulfur-containing poly (unsaturated carboxylic acid) is obtained by polymerizing an unsaturated carboxylic acid in the presence of a combination of at least one persulfate and at least one bisulfite as a polymerization initiator;
   wherein the polymerization initiator is adjusted in such a manner that: the total amount of the polymerization initiator as used is not smaller than 10 g equivalents per 1 mol of the unsaturated carboxylic acid as used, and the amount of the bisulfite accounts for not smaller than 8 g equivalents of the total amount of the polymerization initiator as used; and the polymerization temperature is controlled so as to be in the range of 25 to 90° C.; and
   wherein the sulfur-containing poly (unsaturated carboxylic acid) is further obtained by polymerizing the unsaturated carboxylic acid in the presence of a heavy metal ion, wherein a content of the heavy metal ion is in a range of 0.1 to 10 ppm relative to the total weight of a polymerization reaction liquid when polymerization has been completed;
   wherein the bisulfite or its solution and the unsaturated carboxylic acid or its solution are dropwise added during polymerization, and a dropwise addition time of the bisulfite or its solution is completed earlier than completion of a dropwise addition of the unsaturated carboxylic acid or its solution. by 1 to 30 minutes; and
   wherein said sulfur-containing poly(unsaturated carboxylic acid) comprises a sodium salt of poly(acrylic acid) having a sulfonic acid end group.

3. A detergent builder according to claim 1, which has a molecular weight distribution (Mw/Mn) of not more than 2.0.

4. A detergent builder according to claim 1, which shows a clay dispersibility of not less than 0.5 and a calcium ion scavengeability of not less than 150 mg $CaCO_3$/g.

5. A kaolin dispersant according to claim 2, wherein the unsaturated carboxylic acid is acrylic acid and/or methacrylic acid.

6. A kaolin dispersant according to claim 2, which has a molecular weight distribution (Mw/Mn) of not more than 2.0.

7. A kaolin dispersant according to claim 2, which shows a clay dispersibility of not less than 0.5 and a calcium ion scavengeability of not less than 150 mg $CaCO_3$/g.

8. A detergent builder according to claim 1, wherein the unsaturated carboxylic acid is acrylic acid and/or methacrylic acid.

* * * * *